(12) United States Patent
Vik

(10) Patent No.: US 10,226,963 B2
(45) Date of Patent: Mar. 12, 2019

(54) FACE SEAL WITH INSTALLATION PILOT FOR A WHEEL ASSEMBLY OF A WORK VEHICLE

(71) Applicant: CNH Industrial America, LLC, New Holland, PA (US)

(72) Inventor: Brian Vik, Barnesville, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/079,226

(22) Filed: Mar. 24, 2016

(65) Prior Publication Data

US 2017/0274703 A1 Sep. 28, 2017

(51) Int. Cl.
| | |
|---|---|
| *F16J 15/34* | (2006.01) |
| *B60B 27/00* | (2006.01) |
| *F16C 33/78* | (2006.01) |
| *B62D 55/088* | (2006.01) |
| *B62D 55/15* | (2006.01) |

(52) U.S. Cl.
CPC ........ *B60B 27/0073* (2013.01); *B60B 27/001* (2013.01); *B62D 55/088* (2013.01); *B62D 55/15* (2013.01); *F16C 33/7886* (2013.01); *F16J 15/344* (2013.01); *F16J 15/3464* (2013.01); *B60B 2900/511* (2013.01); *B60Y 2200/25* (2013.01)

(58) Field of Classification Search
CPC .............. B60B 27/0073; B60B 27/001; B60B 2900/511; B62D 55/088; B62D 55/15; F16C 33/7886; F16J 15/3464; F16J 15/344; B60Y 2200/25

USPC ................. 277/351, 306, 348–350, 352, 361
See application file for complete search history.

(56) References Cited

U.S. PATENT DOCUMENTS

| | | | |
|---|---|---|---|
| 4,428,586 | A | 1/1984 | Romero |
| 4,856,794 | A | 8/1989 | Boyers et al. |
| 5,209,499 | A | 5/1993 | Ruff, Jr. et al. |
| 6,712,580 | B2 | 3/2004 | Iketani |
| 7,287,910 | B2 | 10/2007 | Kobayashi et al. |
| 7,854,434 | B2 | 12/2010 | Heiman et al. |
| 8,075,196 | B2 | 12/2011 | Burner et al. |
| 8,517,389 | B2 | 8/2013 | Okaji et al. |
| 8,534,926 | B2 | 9/2013 | Suzuki et al. |
| 8,636,286 | B2 | 1/2014 | Vik |
| 8,641,289 | B2 | 2/2014 | Scott |

(Continued)

*Primary Examiner* — Nathan Cumar
(74) *Attorney, Agent, or Firm* — Rickard K. DeMille; Rebecca L. Henkel

(57) ABSTRACT

A face seal for use within a wheel assembly may include an inner sealing ring and an outer sealing ring. The outer sealing ring may include a first flange, a second flange and an outer cylindrical portion extending between the first and second flanges. The outer cylindrical portion may include a first cylindrical section extending axially from the first flange and a second cylindrical section extending axially between the first cylindrical section and the second flange. The face seal may also include an inner elastomeric ring and an outer elastomeric ring having an axial portion extending radially outwardly from the second cylindrical section of the outer cylindrical portion. Additionally, the axial portion may be radially offset from the first cylindrical section of the outer cylindrical portion such that an outer surface of the first cylindrical section is spaced radially outwardly relative to an outer surface of the axial portion.

20 Claims, 10 Drawing Sheets

(56) References Cited

U.S. PATENT DOCUMENTS

| | | |
|---|---|---|
| 8,827,563 B2 | 9/2014 | Tate et al. |
| 9,011,015 B2 | 4/2015 | Ishikawa et al. |
| 2002/0181817 A1* | 12/2002 | Novak, Jr. .............. B60B 27/00 384/477 |
| 2005/0047693 A1* | 3/2005 | Niebling ............. F16C 33/7886 384/484 |
| 2006/0125189 A1* | 6/2006 | Peschke ................ F16C 21/005 277/349 |
| 2009/0154855 A1 | 6/2009 | Kametaka |
| 2012/0161500 A1* | 6/2012 | Vik ........................ F16J 15/344 301/105.1 |
| 2015/0151573 A1 | 6/2015 | Shibayama |

* cited by examiner

FACE SEAL WITH INSTALLATION PILOT FOR A WHEEL ASSEMBLY OF A WORK VEHICLE

FIELD OF THE INVENTION

The present subject matter relates generally to wheel assemblies for work vehicles and, more particularly, to a mechanical face seal having an installation pilot to facilitate press-fitting the seal into a wheel assembly of a work vehicle.

BACKGROUND OF THE INVENTION

Axial face seals (or "face seals") are used to seal two relatively rotating bodies against each other. Face seals keep dirt and other contamination from reaching sensitive parts of a machine, such as bearings, and are also used to retain fluid within a fluid-filled housing. Typically, face seals are designed to be mounted and assembled as pairs in a face-to-face relationship, with the two sealing rings (typically highly polished metal rings) facing each other and rotating relative to one another. Two-piece seals are considered to be particularly susceptible to misassembly, misalignment, wear and damage because the two sealing rings, both being made of metal, are prone to wear and overheating.

In many instances, face seals may be used with rubber-tracked vehicles having high travel speeds, which, in turn, produce high face seal temperatures due to the high circumferential face speeds. For example, the larger the seal, the larger the circumference and hence face speed, and therefore higher temperature for a given vehicle speed. Wear and overheating may be heightened in applications involving vehicles having high travel speeds. Additionally, rubber-tracked vehicles may also experience high tractive effort and track tension. High tractive effort and high pre-load track tension place a large load on the bearings of the idler wheels. As such, large, high-capacity bearings are required. In turn, larger circumference face seals are also required for such applications.

To address the above-identified issues associated with face seals, U.S. Pat. No. 8,636,286 ("the '286 patent") discloses a face seal and bearing assembly designed to improve the reliability of rubber-track vehicle wheel assemblies. Specifically, the '286 patent discloses a seal configuration that allows for the seal diameter to be smaller than the associated bearing, thereby reducing heat produced by the face seal during operation while still limiting any tension and reaction forces applied to the bearings. While such seal configuration certainly provides improvements over other conventional face seals used for track-driven work vehicles, further improvements and/or refinements are still needed, particularly with respect to installing face seals within an associated wheel assembly.

Accordingly, an improved face seal having an installation pilot to facilitate press-fitting the seal into a wheel assembly of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a face seal for use within a wheel assembly. The face seal may include an inner sealing ring and an outer sealing ring spaced radially outwardly from the inner sealing ring. The outer sealing ring may include a first flange, a second flange spaced apart axially from the first flange and an outer cylindrical portion extending between the first and second flanges. The outer cylindrical portion may include a first cylindrical section extending axially from the first flange and a second cylindrical section extending axially between the first cylindrical section and the second flange. The face seal may also include an inner elastomeric ring extending between the inner and outer sealing rings and an outer elastomeric ring having an axial portion extending radially outwardly from the second cylindrical section of the outer cylindrical portion. The axial portion may define an outer surface. Additionally, the axial portion may be radially offset from the first cylindrical section of the outer cylindrical portion such that an outer surface of the first cylindrical section is spaced radially outwardly relative to the outer surface of the axial portion.

In another aspect, the present subject matter is directed to a wheel assembly for a work vehicle. The wheel assembly may include a shaft and a wheel hub rotatable relative the shaft that defines a bore and at least one bearing assembly positioned between the shaft and the wheel hub. The wheel assembly may also include a face seal at least partially installed within the bore. The face seal may include an inner sealing ring and an outer sealing ring spaced radially outwardly from the inner sealing ring. The outer sealing ring may include a first flange, a second flange spaced apart axially from the first flange and an outer cylindrical portion extending between the first and second flanges. The outer cylindrical portion may include a first cylindrical section extending axially from the first flange and a second cylindrical section extending axially between the first cylindrical section and the second flange. The face seal may also include an inner elastomeric ring extending between the inner and outer sealing rings and an outer elastomeric ring having an axial portion extending radially outwardly from the second cylindrical section of the outer cylindrical portion. The axial portion may define an outer surface. Additionally, the axial portion may be radially offset from the first cylindrical section of the outer cylindrical portion such that an outer surface of the first cylindrical section is spaced radially outwardly relative to the outer surface of the axial portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
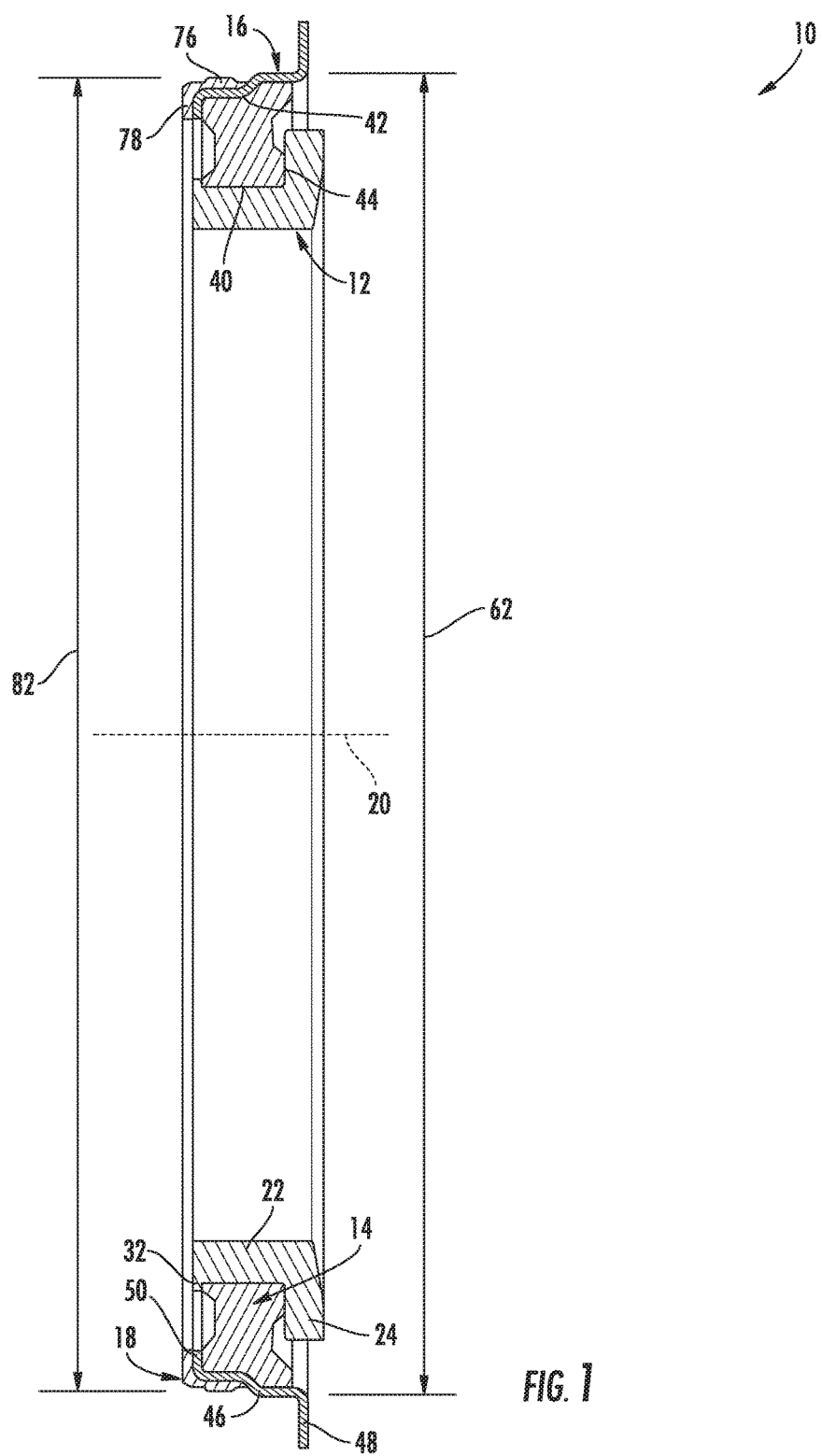
FIG. 1 illustrates a cross-sectional view of one embodiment of a face seal in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a face seal having an installation pilot incorporated therewith to facilitate press-fitting the seal into a wheel assembly of a work vehicle. Specifically, in several embodiments, the face seal may have a first outer diameter (OD) defined by a cylindrical section of an outer sealing ring of the face seal and a second outer diameter defined by an axial portion of an outer elastomeric ring of the face seal, with the second OD being smaller than the first OD. As such, the axial portion of the outer elastomeric ring may serve as an installation pilot when installing the face seal into a hub bore of a corresponding wheel assembly. For example, as will be described below, the hub bore may have a stepped profile include a first bore portion and a second bore portion, with the first bore portion defining a larger inner diameter (ID) than the second bore portion. In such an embodiment, the smaller OD of the axial portion of the outer elastomeric ring may allow the axial portion to be easily inserted into the larger, first bore portion of the hub bore, thereby allowing the face seal to be properly aligned relative to the bore. Thereafter, the face seal may be inserted further into the hub bore such that the larger OD of the outer sealing ring is press-fit into the first bore portion of the hub bore.

As indicated above, a face seal and bearing assembly designed to improve the reliability of rubber-track vehicle wheel assemblies is disclosed in U.S. Pat. No. 8,636,286 ("the '286 patent"), the disclosure of which is hereby incorporated by reference herein in its entirety for all purposes. In accordance with aspects of the present subject matter, the seal configuration disclosed herein may be utilized with the face seals described in the '286 patent to improve the installation process of such face seals. Specifically, the reduced OD of the outer elastomeric ring of the face seal described herein may allow such face seal to be installed within a hub bore without damaging the elastomeric material due to misalignment of the face seal relative to the hub bore.

Figure 2:
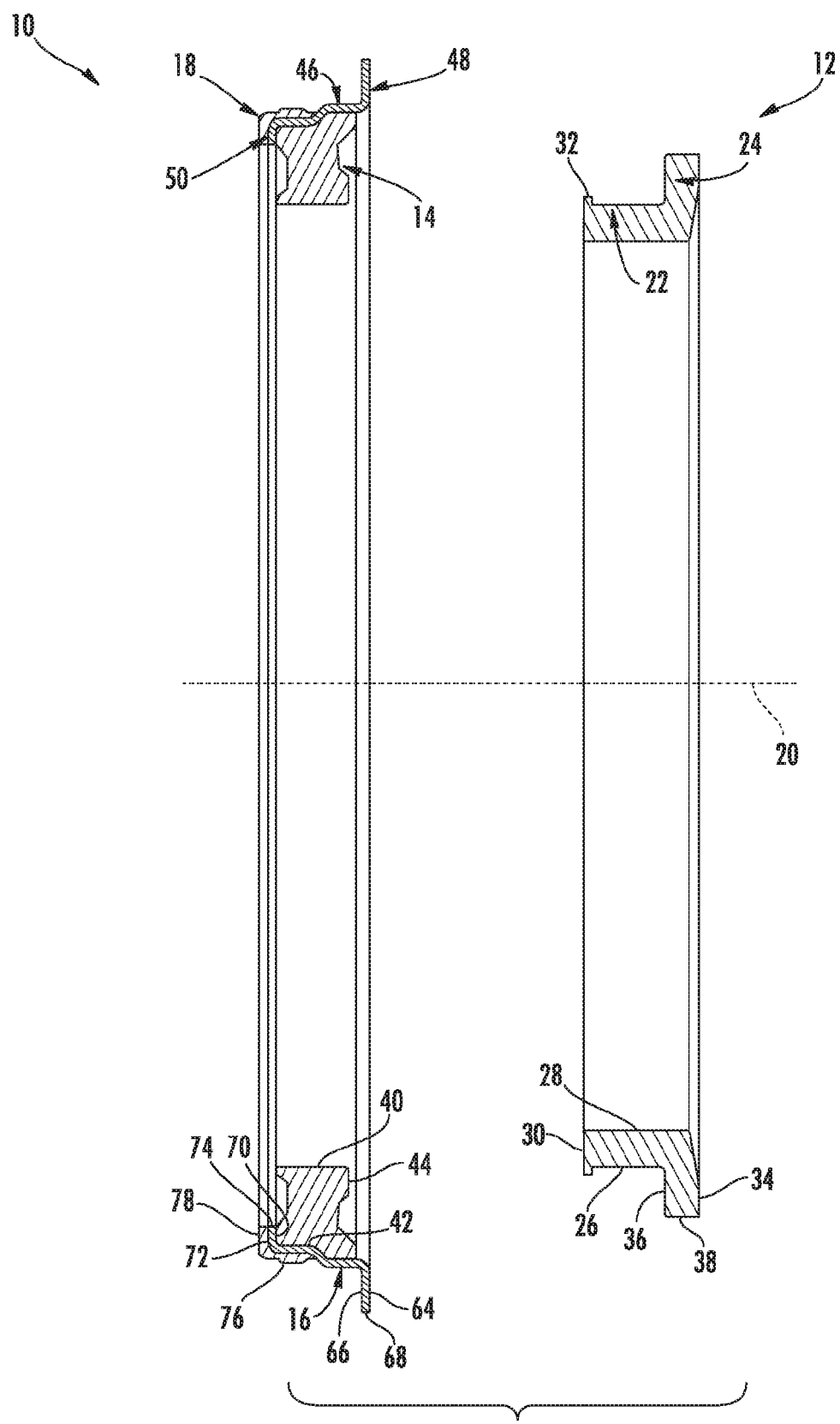
FIG. 2 illustrates another cross-sectional view of the face seal shown in FIG. 1, particularly illustrating one of the seal components of the face seal being exploded away from the remainder of the face seal.
Figure 3:
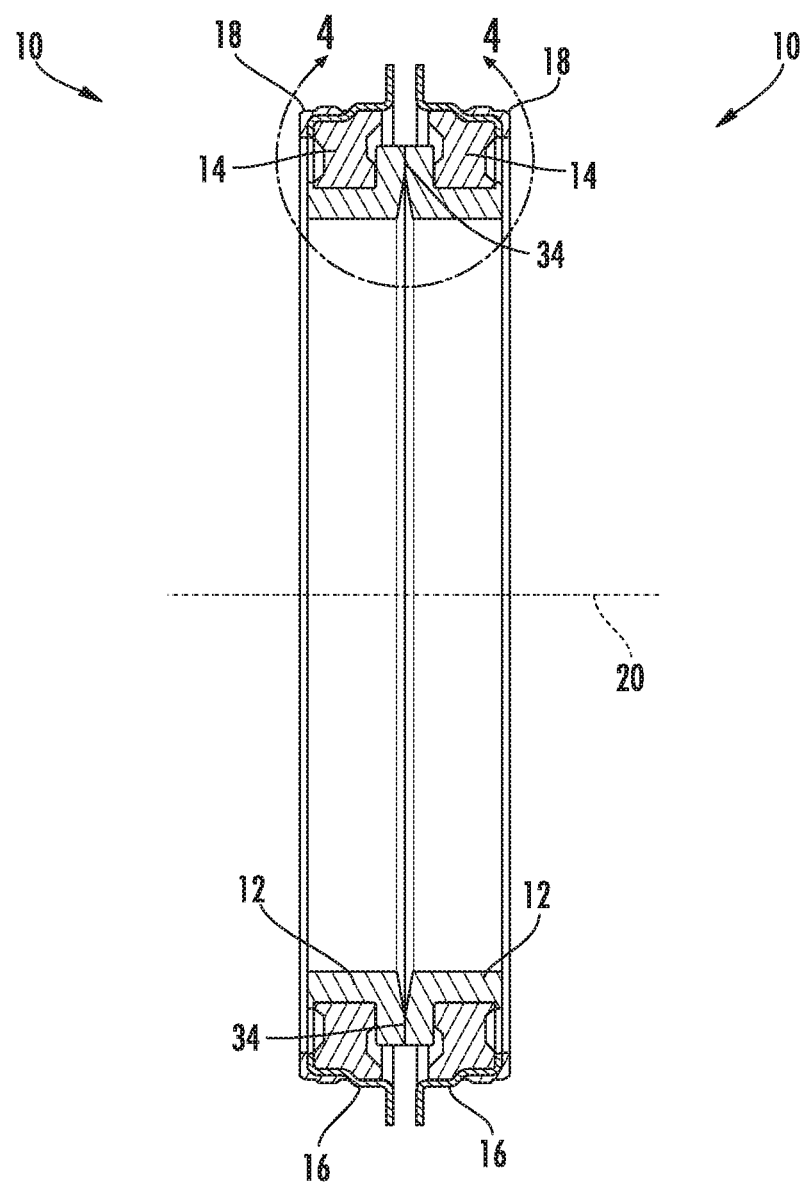
FIG. 3 illustrates a cross-sectional view of two face seals identical to the face seal shown in FIG. 1, particularly illustrating the face seals provided in a face-to-face relationship relative to one another in accordance with aspects of the present subject matter.
Figure 4:
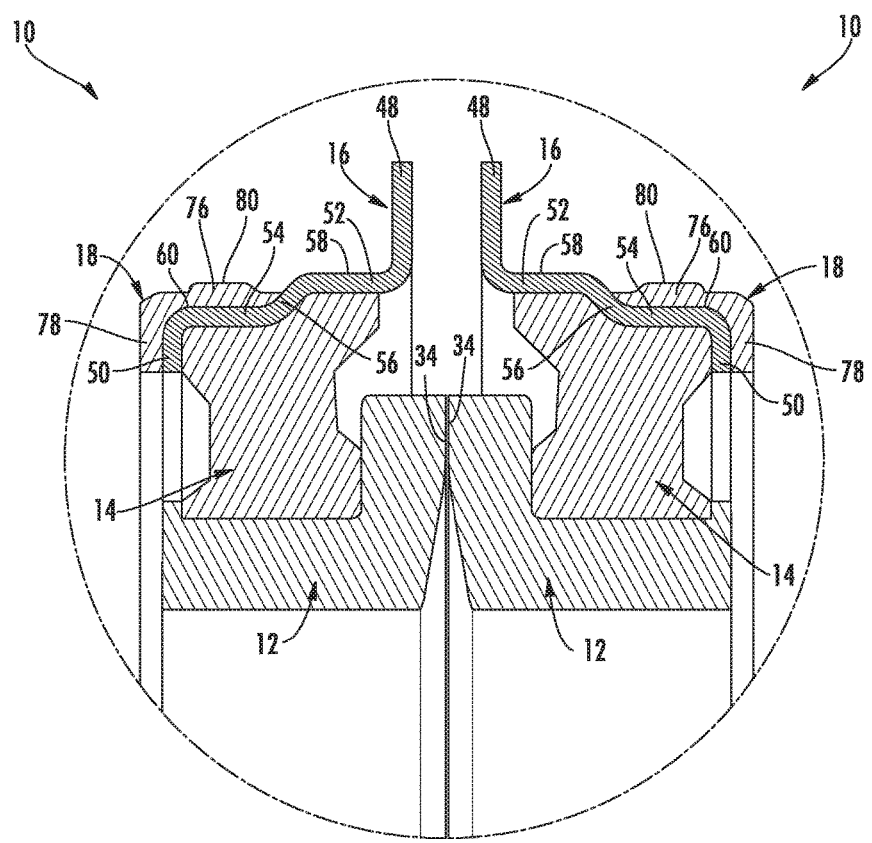
FIG. 4 illustrates a cross-sectional view of a portion of the abutting face seals shown in FIG. 3, particularly illustrating the portion of the face seals contained within semi-circle 4-4 shown in FIG. 3.

Referring now to the drawings, FIGS. 1-4 illustrate cross-sectional views of one embodiment of a mechanical face seal(s) 10 in accordance with aspects of the present subject matter. Specifically, FIG. 1 illustrates a cross-sectional view of the face seal 10 and FIG. 2 illustrates a cross-sectional view of the face seal 10 shown in FIG. 1 with one of the seal components being exploded away from the remainder of the face seal 10. FIG. 3 illustrates a cross-sectional view of two face seals 10 positioned face-to-face relative to one another, with each face seal 10 having the same configuration as the face seal 10 shown in FIG. 1. Additionally, FIG. 4 illustrates a close-up, cross-sectional view of the portion of the face seals 10 shown in FIG. 3 contained within semi-circle 4-4. As shown in the illustrated embodiment, the disclosed face seal 10 may generally include an inner sealing ring 12, an inner elastomeric ring 14, an outer sealing ring 16 and an outer elastomeric ring 18.

In general, the inner sealing ring 12 may be positioned along the radially inner side of the face seal 10 (i.e., closest to a central axis 20 associated with the seal face 10). As shown in FIGS. 1 and 2, in several embodiments, the inner sealing ring 12 may include an inner cylindrical portion 22 extending axially generally parallel to the central axis 20 and a planar ring portion 24 extending radially generally perpendicular to the central axis 20. In such embodiments, the inner cylindrical portion 22 and the planar ring portion 24 of the inner sealing ring 12 may generally form an "L-shaped" cross-section.

As shown in FIG. 2, the inner cylindrical portion 22 may include an outer cylindrical wall 26, an inner cylindrical wall 28 and a radial edge 30 extending between the outer and inner cylindrical walls 26, 28. In one embodiment, the outer cylindrical wall 26 may be spaced apart from the inner cylindrical wall 28 by a generally constant radial distance along the axial length of the inner cylindrical portion 22. In addition, as shown in FIGS. 1 and 2, in one embodiment, the inner cylindrical portion 22 may be configured to define a radial lip 32 adjacent to the radial edge 30 that extends radially outwardly relative to the outer cylindrical wall 26. Such radial lip 32 may, for example, serve as a retention feature for the inner elastomeric ring 14.

Additionally, as shown in FIG. 2, the planar ring portion 24 of the inner sealing ring 12 may generally correspond to a planar disk having a radially extending seal-side planar wall 34, a radially extending hub-side planar wall 36, and an outer cylindrical edge 38 extending axially between the opposed planar walls 34, 36. In one embodiment, the seal-side planar wall 34 may define a sealing surface that is configured to engage a corresponding mating surface of an adjacent face seal 10. For instance, such an arrangement is shown in FIGS. 3 and 4, which illustrates two identical face seals 10 provided in a face-to-face relationship relative to one another such that the seal-side planar wall 34 of each face seal 10 is positioned directly against or adjacent to the seal-side planar wall 34 of the adjacent face seal 10.

It should be appreciated that, in general, the seal-side planar wall 34 of the planar ring portion 24 of the inner sealing ring 12 may be substantially planar. However, when a pair of opposing face seals 10 is assembled relative to a wheel assembly (e.g., the wheel assembly 100 shown in FIG. 5), the seal-side planar wall 34 of each face seal 10 may be configured to deflect slightly in a known way to encourage the flow of lubricating oil in-between the two opposing seal-side planar walls 34.

Referring still to FIGS. 1-4, the inner elastomeric ring 14 may be configured to be positioned between the inner sealing ring 12 and the outer sealing ring 16 of the face seal 10. In general, the inner elastomeric ring 14 may be configured to serve as a resilient support member for the face seal 10 between the inner and outer sealing rings 12, 16. As such, due to its flexibility, the inner elastomeric ring 14 may allow the face seal 10 to accommodate slight misalignments between the central axis 20 and a corresponding bore (not shown) of a suitable wheel assembly within which the face seal 10 is configured to be installed. In addition, the inner elastomeric ring 14 may provide a leak-proof seal between the inner and outer sealing rings 12, 16.

As particularly shown in FIGS. 1 and 2, the inner elastomeric ring 14 may include an inner cylindrical wall 40 that is configured to be positioned against or adjacent to the outer cylindrical wall 26 of the inner sealing ring 12. In one embodiment, the inner cylindrical wall 40 of the inner elastomeric ring 14 may be retained against the outer cylindrical wall 26 of the inner sealing ring 12 via friction. Alternatively, the inner cylindrical wall 26 of the inner elastomeric ring 14 may be bonded or otherwise coupled to the outer cylindrical wall 26 of the inner sealing ring 12. Additionally, the inner elastomeric ring 14 may include an outer wall 42 that is configured to be positioned against or adjacent to the outer sealing ring 16. Similar to the inner cylindrical wall 40, the outer wall 42 may be retained against the outer sealing ring 16 via friction or may be bonded or otherwise coupled to the outer sealing ring 16. Moreover, as shown in FIGS. 1 and 2, the inner elastomeric ring 14 may include a seal-facing wall 44 that is configured to seal against an adjacent surface defined by the hub-side planar wall 36 of the planar ring portion 24 of the inner sealing ring 12.

As shown in FIGS. 1 and 2, the outer sealing ring 16 of the face seal 10 may generally be positioned radially outwardly from the inner elastomeric ring 14. In general, the outer sealing ring 16 may include an outer cylindrical portion 46 extending generally axially between a radially extending seating flange 48 at one end and a radially extending backing flange 50 at the other end. In such an embodiment, the outer sealing ring 16 may generally define a "Z-shaped" cross-section.

In several embodiments, the outer cylindrical portion 46 of the outer sealing ring 16 may include a first cylindrical section 52 (FIG. 4), a second cylindrical section 54 (FIG. 4) spaced radially inwardly from the first cylindrical section 52 and a transition section 56 (FIG. 4) extending between the first and second cylindrical sections 52, 54. For instance, as shown in FIG. 4, the first cylindrical section 52 may be configured to extend axially from the seating flange 48 in the direction of the backing flange 50 to the transition section 56. Additionally, the second cylindrical section 54 may be configured to extend axially away from the transition section 56 to the backing flange 50. As shown in FIG. 4, the transition section 56 extends at an angle between the first and second cylindrical sections 52, 54, with the angle including a radially inwardly extending directional component. As such, a radially outer surface 58 of the first cylindrical section 52 may be spaced radially outwardly from a corresponding radially outer surface 60 of the second cylindrical section 54. For instance, as shown in FIG. 1, the radially outer surface 58 of the first cylindrical section 52 may define an outer diameter 62 that is greater than the outer diameter (not shown) of the radially outer surface 60 of the second cylindrical section 54. As will be described below, the radially outer surface 58 of the first cylindrical section 52 may be configured to be engaged against a corresponding bore surface when the disclosed face seal 10 is press-fit into a suitable wheel assembly.

It should be appreciated that the seating flange 48 may generally be configured to extend radially outwardly from the first cylindrical section 52 of the outer cylindrical portion 46 to provide an outer diameter for the face seal 10 to be used in providing positive depth control during installation of the face seal 10. As shown in FIG. 2, the seating flange 48 may include a seal-side planar wall 64, a hub-side planar wall 66, and an outer cylindrical edge 68 extending between the opposed planar walls 64, 66. Additionally, as shown in FIG. 2, the backing flange 50 may generally be configured to extend radially inwardly from the second cylindrical section 54 of the outer cylindrical portion 46 and may include a seal-side planar wall 70, a housing-side planar wall 72, and an inner cylindrical edge 74 extending axially between the opposed planar walls 70, 72.

Moreover, as shown in FIGS. 1 and 2, the outer elastomeric ring 18 may generally be configured to extend around a portion of the outer sealing ring 16 to provide a resilient sealing member along a portion of the outer perimeter of the face seal 10. Specifically, as shown in FIG. 4, in several embodiments, the outer elastomeric ring 18 may include an axial portion 76 extending axially along the second cylindrical section 54 of the outer sealing ring 16 and a radial portion 78 extending radially along the backing flange 50 such that the outer elastomeric ring 18 forms a substantially "L-shaped" cross-section.

In accordance with aspects of the present subject matter, the axial portion 76 of the outer elastomeric ring 18 may be configured to extend radially outwardly relative to the second cylindrical section 54 of the outer sealing ring 16 only to an extent such that an outer surface 80 (FIG. 4) of the axial portion 76 is spaced radially inwardly from the radially outer surface 58 of the first cylindrical section 52 of the outer sealing ring 16. For instance, as shown in FIG. 1, the outer surface 80 of the axial portion 76 may define an outer diameter 82 that is less than the outer diameter 62 defined by the radially outer surface 58 of the first cylindrical section 52. As will be described below, by radially offsetting the outer surface 80 of the axial portion 76 from the radially outer surface 58 of the first cylindrical section 52, the axial portion 76 of the outer elastomeric ring 18 may serve as an installation pilot when installing the disclosed face seal 10 within a wheel assembly.

It should be appreciated that the inner and outer elastomeric rings 14, 18 may generally be formed from any suitable material. In one embodiment, the composition of each elastomeric ring 14, 18 may be a polymer having high temperature resistance, which may allow for the disclosed face seal 10 to be advantageously used for high speed/ temperature applications, such as within rubber-tracked undercarriages for a work vehicle (e.g., within the wheel assembly 100 shown in FIG. 5). In a particular embodiment, the polymer used to form each elastomeric ring 14, 18 may be a fluoropolymer, preferably a fluoroelastomer, and more preferably a dipolymer or terpolymer of vinylidene fluoride and hexafluoropropylene, or vinylidene fluoride, hexafluoropropylene and tetrafluoroethylene.

It should also be appreciated that, in one embodiment, each of the elastomeric rings 14, 18 may take a thermal set of less than about 40%, even more preferably less than about 30%, and even more preferably less than about 20% using the ASTM D 395 standard test procedure at 200 degrees Celsius for 22 hours. Additionally, in one embodiment, each elastomeric ring 14, 18 may have a low temperature retraction (a "TR10") of less than about 0 degrees Celsius, more preferably less than about −10 degrees Celsius and even more preferably less than about −20 degrees Celsius. Such low temperature retraction may be measured using the ASTM D 1329 testing procedure.

Additionally, it should be appreciated that, in several embodiments, the inner and outer elastomeric rings 14, 18 may be formed integrally with one another. For instance, in one embodiment, the radial portion 78 of the outer elastomeric ring 18 may be extended such that the outer elastomeric ring 18 wraps around the inner cylindrical edge 74 of the backing flange 50 and is joined with the inner elastomeric ring 14. In such an embodiment, the integrally formed elastomeric ring may be configured to both extend radially between the inner and outer sealing rings 12, 16 and wrap around the backing flange 50 of the outer sealing ring 16 to allow a portion the elastomeric ring to be positioned radially outwardly of the second cylindrical section 54 of the outer sealing ring 16.

Figure 5:
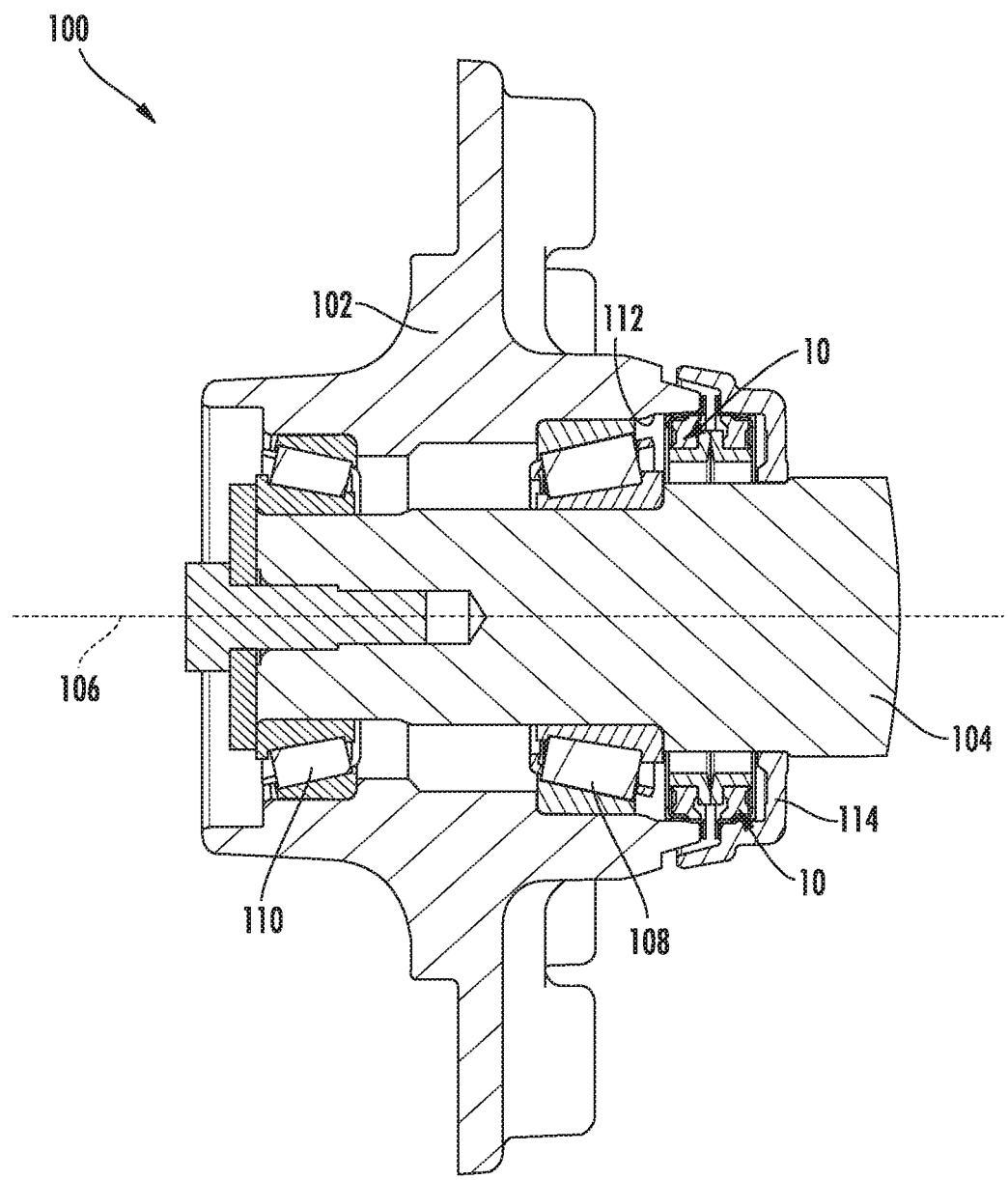
FIG. 5 illustrates a cross-sectional view of one embodiment of a wheel assembly within which the disclosed face seals may be installed in accordance with aspects of the present subject matter.
Figure 6:
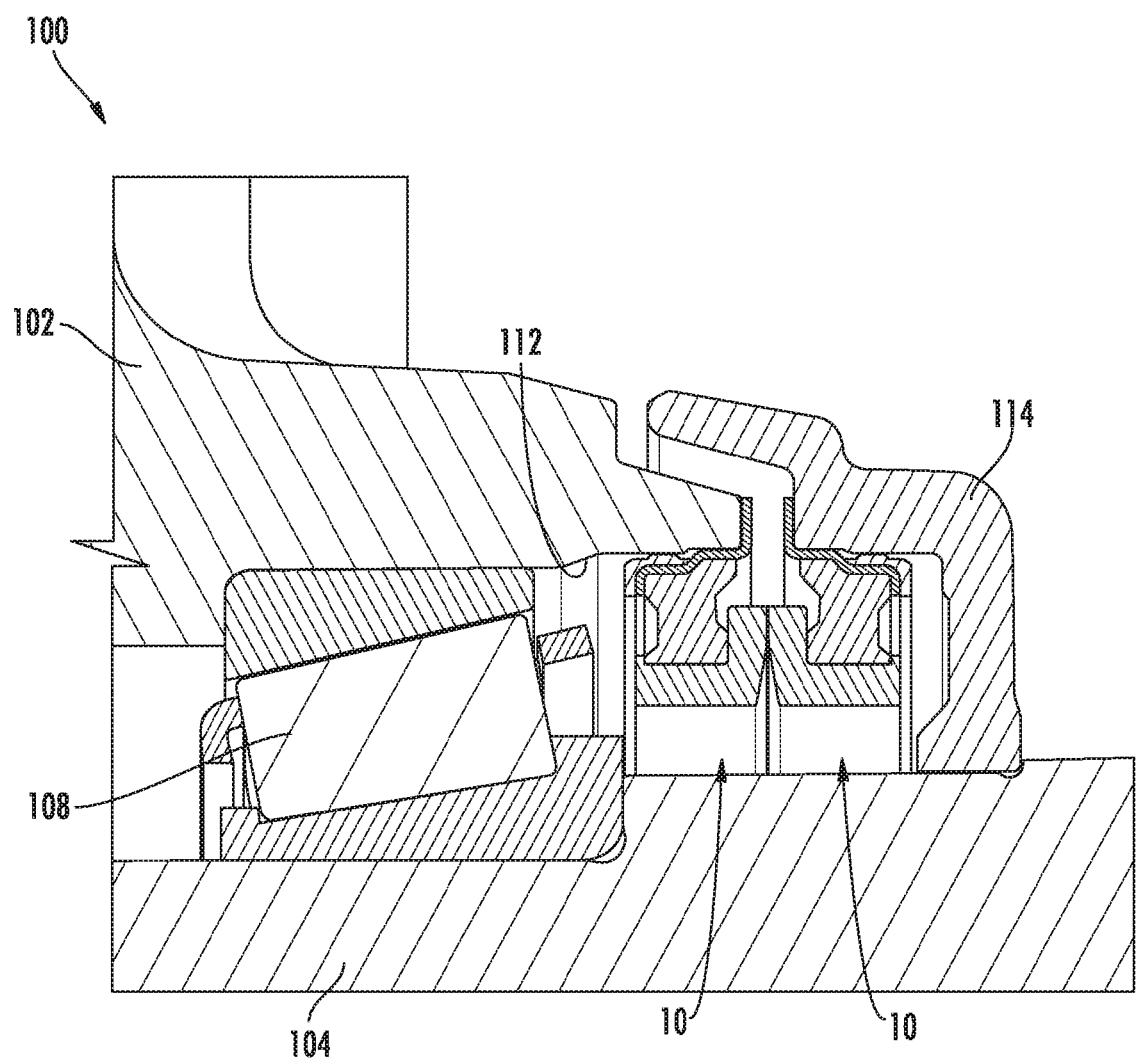
FIG. 6 illustrates a cross-sectional view of a portion of the wheel assembly shown in FIG. 5, particularly illustrating one of the face seals being press-fit into a bore defined by a wheel hub of the wheel assembly and the other face seal being press-fit into a seal coupled to a shaft associated with the wheel assembly.

Referring now to FIGS. 5 and 6, differing views of one embodiment of a wheel assembly 100 within which the disclosed face seal(s) 10 may be advantageously utilized is illustrated in accordance with aspects of the present subject matter. Specifically, FIG. 5 illustrates a cross-sectional view of the wheel assembly 100 and FIG. 6 illustrates a close-up, cross-sectional view of a portion of the wheel assembly 100 shown in FIG. 5.

As shown, the wheel assembly 100 may include a rotating wheel hub 102 mounted on a stationary shaft 104 to allow the wheel hub 102 to rotate about a rotational axis 106 (e.g., an axis generally aligned with the central axis 20 of the face seals 10). In addition, the wheel assembly 100 may include one or more bearing assemblies 108, 110 positioned between the wheel hub 102 and the shaft 104. For instance, as shown in FIG. 5, the wheel assembly 100 may include both an inboard bearing assembly 108 and an outboard bearing assembly 110 positioned around the shaft 104 so as to define the rotational movement of the wheel hub 102 about the rotational axis 106.

Moreover, as shown in FIGS. 5 and 6, the wheel assembly 100 may include two of the disclosed face seals 10 positioned around the shaft 104. For instance, as shown, one of the face seals 10 may be configured to be press-fit into a corresponding bore 112 defined by the wheel hub 102. Additionally, the abutting face seal 10 may be configured to be press-fit into a corresponding seal housing 114 mounted on the shaft 104. Thus, when the wheel hub 102 is mounted on the shaft 104, the face seals 10 may abut one another and form a seal, thereby preventing dirt and/or other debris from reaching the shaft 104 and/or the bearing assemblies 108, 110.

Figure 7A:
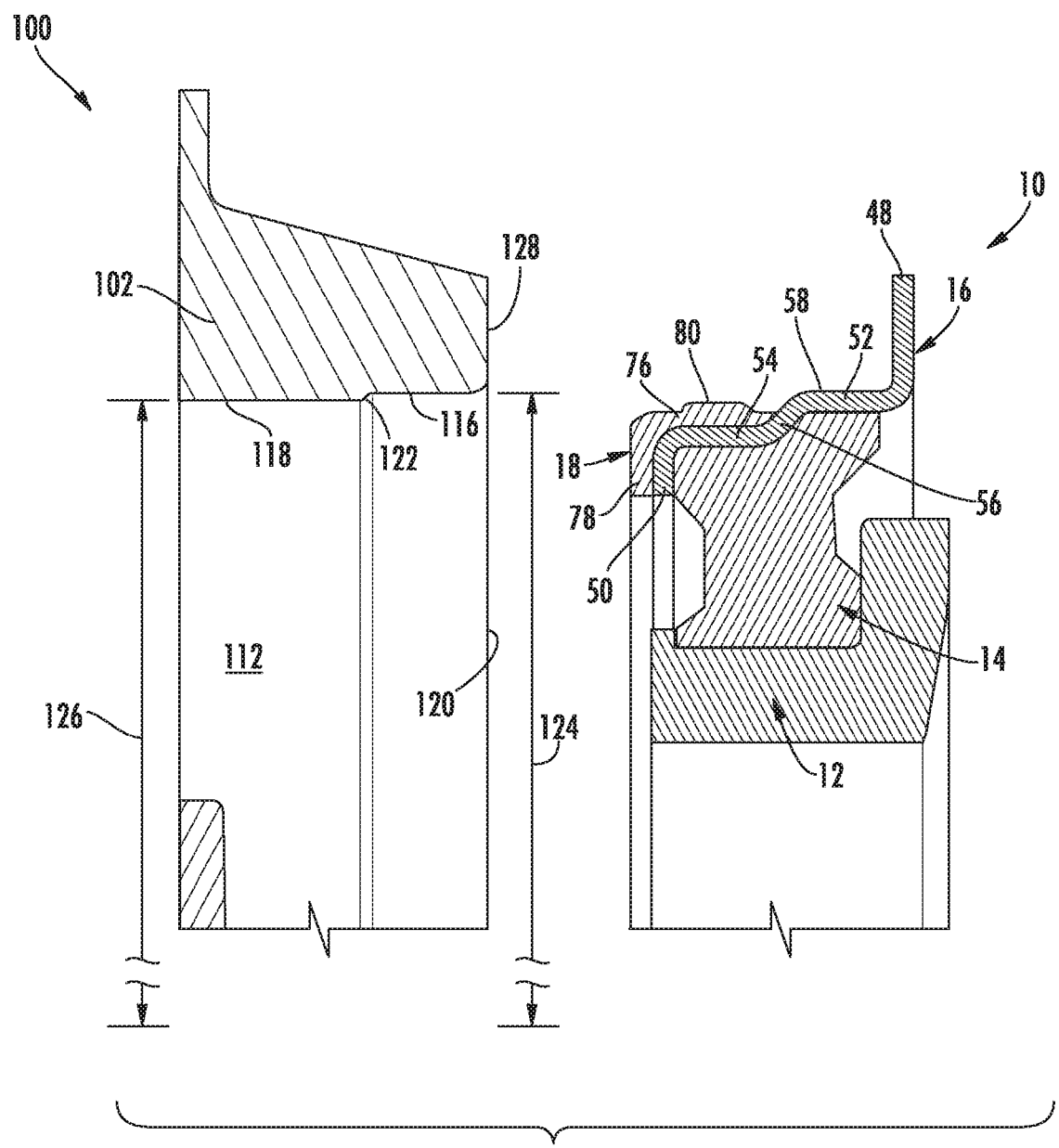
FIG. 7A illustrates a cross-sectional view of portions of the wheel hub and one of the face seals shown in FIG. 6, particularly illustrating the face seal exploded away from the wheel hub.
Figure 7B:
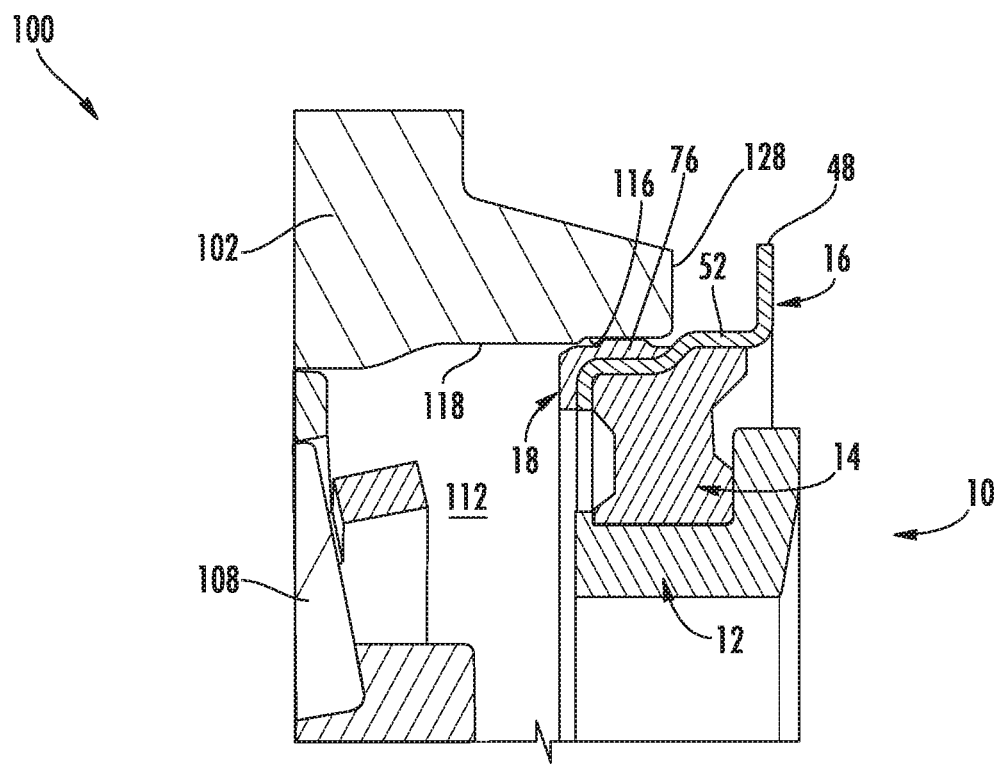
FIG. 7B illustrates another cross-sectional view of the portions of the wheel hub and the face seal shown in FIG. 7A, particularly illustrating the face seal being partially installed within the wheel hub.
Figure 7C:
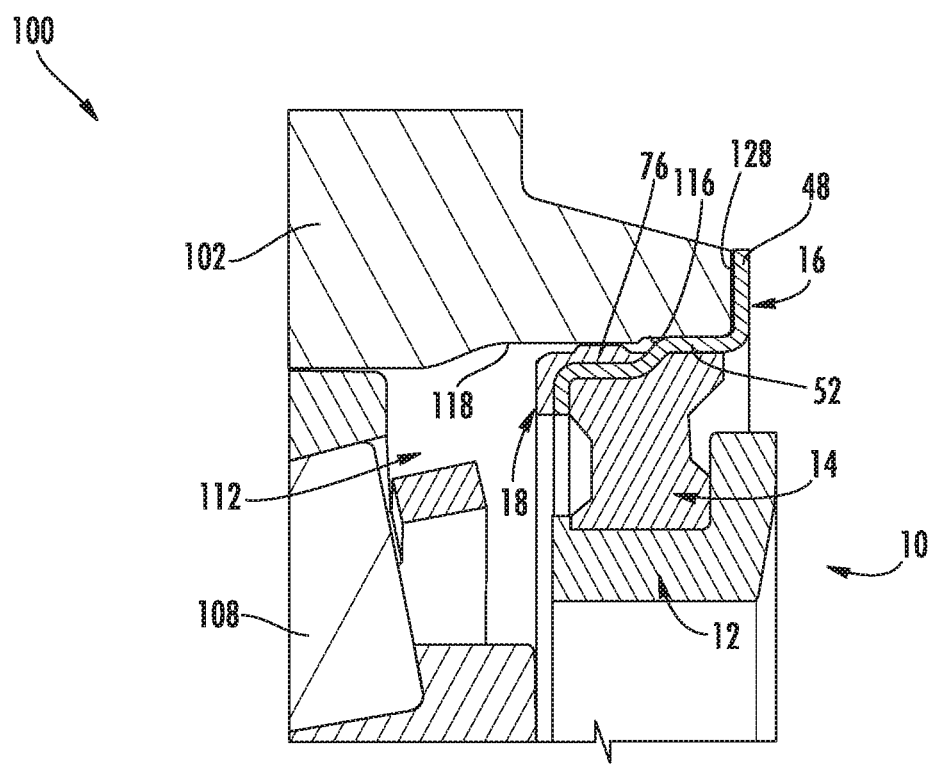
FIG. 7C illustrates yet another cross-sectional view of the portions of the wheel hub and the face seal shown in FIG. 7A, particularly illustrating the face seal being fully installed within the wheel hub.

One embodiment of a method for installing one of the disclosed face seals 10 within a wheel hub will now be discussed with reference to FIGS. 7A-7C. Specifically, FIG. 7A illustrates a portion of a face seal 10 exploded away from a portion of the bore 112 of the wheel hub 102 described above with reference to FIGS. 5 and 6. FIG. 7B illustrates the face seal 10 partially installed within the bore 112. Additionally, FIG. 7C illustrates the face seal 10 fully installed within the bore 112.

As particularly shown in FIG. 7A, the bore 112 may be defined in the wheel hub 102 so as to have a stepped configuration or profile. Specifically, in several embodiments, the bore 112 may include a first bore portion 116 extending axially from an insertion end 120 of the bore 112 to a transition wall segment 122 extending radially inwardly relative to the first bore portion 116. In addition, the bore 112 may include a second bore portion 118 extending axially from the transition wall segment 122 in a direction away from the insertion end 120 of the bore 112. In such an embodiment, the second bore portion 118 may be spaced radially inwardly from the first bore portion 116. For instance, as shown in FIG. 7A, an inner diameter 124 of the bore 112 defined at the first bore portion 116 may be greater than an inner diameter 126 of the bore 112 defined at the second bore portion 118.

In accordance with aspects of the present subject matter, the radial offset defined between the first and second bore portions 116, 118 may generally be selected based on the radial offset defined between the axial portion 76 of the outer elastomeric ring 18 and the first cylindrical section 52 of the outer sealing ring 16. Specifically, in several embodiments, the outer diameter 82 defined by the axial portion 76 of the outer elastomeric ring 18 may be sized relative to the inner diameter 124 defined by the first bore portion 116 such that a loose-fit is provided between the axial portion 76 and the first bore portion 116 when the face seal 10 is initially inserted into the bore 112 at its insertion end 120. For instance, in one embodiment, the outer diameter 82 defined by the axial portion 76 of the outer elastomeric ring 18 may be less than the inner diameter 124 defined by the first bore portion 116. Additionally, the outer diameters 82, 62 defined by the axial portion 76 of the outer elastomeric ring 18 and the first cylindrical section 52 of the outer sealing ring 16 may be sized relative to the inner diameters 124, 126 defined by the first and second bore portions 116, 118 such that a press-fit is provided between the adjacent surfaces of the face seal 10 and the bore 112 when the face seal 10 is fully installed within the bore 112. For instance, in one embodiment, the outer diameter 82 defined by the axial portion 76 of the outer elastomeric ring 18 may be greater than or equal to the inner diameter 126 defined by the second bore portion 118 while the outer diameter 62 defined by the first cylindrical section 52 of the outer sealing ring 16 may be greater than or equal to the inner diameter 124 defined by the first bore portion 116, thereby allowing a press-fit to be achieved between such adjacent features.

For instance, as shown in FIG. 7B, when the face seal 10 is initially inserted into the bore 112 at its insertion end 120, a loose fit may be provided between the outer surface 80 of the axial portion 76 of the outer elastomeric ring 18 and the adjacent surface defined by the first bore portion 116. As such, the radially offset outer elastomeric ring 18 may serve as an installation pilot feature for properly aligning the face seal 10 relative to the bore 112. As shown in FIG. 7C, once the face seal 10 has been properly aligned relative to the bore 112, the face seal 10 may be pressed further inward into the bore 112 to complete the installation of the face seal 10 (e.g., by pressing the face seal 10 into the bore 112 until the seating flange 48 contacts against or is other positioned adjacent to a corresponding face 128 of the wheel hub 102). At such an installed position, a press-fit may be provided between the first bore portion 116 and the first cylindrical section 52 of the outer sealing ring 16. In addition, a press-fit may also be provided between the second bore portion 118 and the axial portion 76 of the outer elastomeric ring 18.

It should be appreciated that a similar installation process may be provided with the face seal 10 configured to be installed within the seal housing 114 mounted to the shaft 104. For instance, the seal housing 114 may define a similar bore opening having a stepped profile configured to accommodate the radial offset defined between the axial portion 76 of the outer elastomeric ring 18 and the first cylindrical section 52 of the outer sealing ring 16.

It should also be appreciated that the disclosed face seals 10 and associated wheel assembly 100 may generally be utilized in any suitable application or setting. However, in several embodiments, the present subject matter may be particularly advantageous for use within a track assembly of a track-driven work vehicle, such as an agricultural tractor. For instances, FIGS. 8 and 9 illustrate one embodiment of a suitable work vehicle 200 and associated track assembly 202, 204 in which the disclosed face seals 10 and wheel assembly 100 may be installed.

Figure 8:
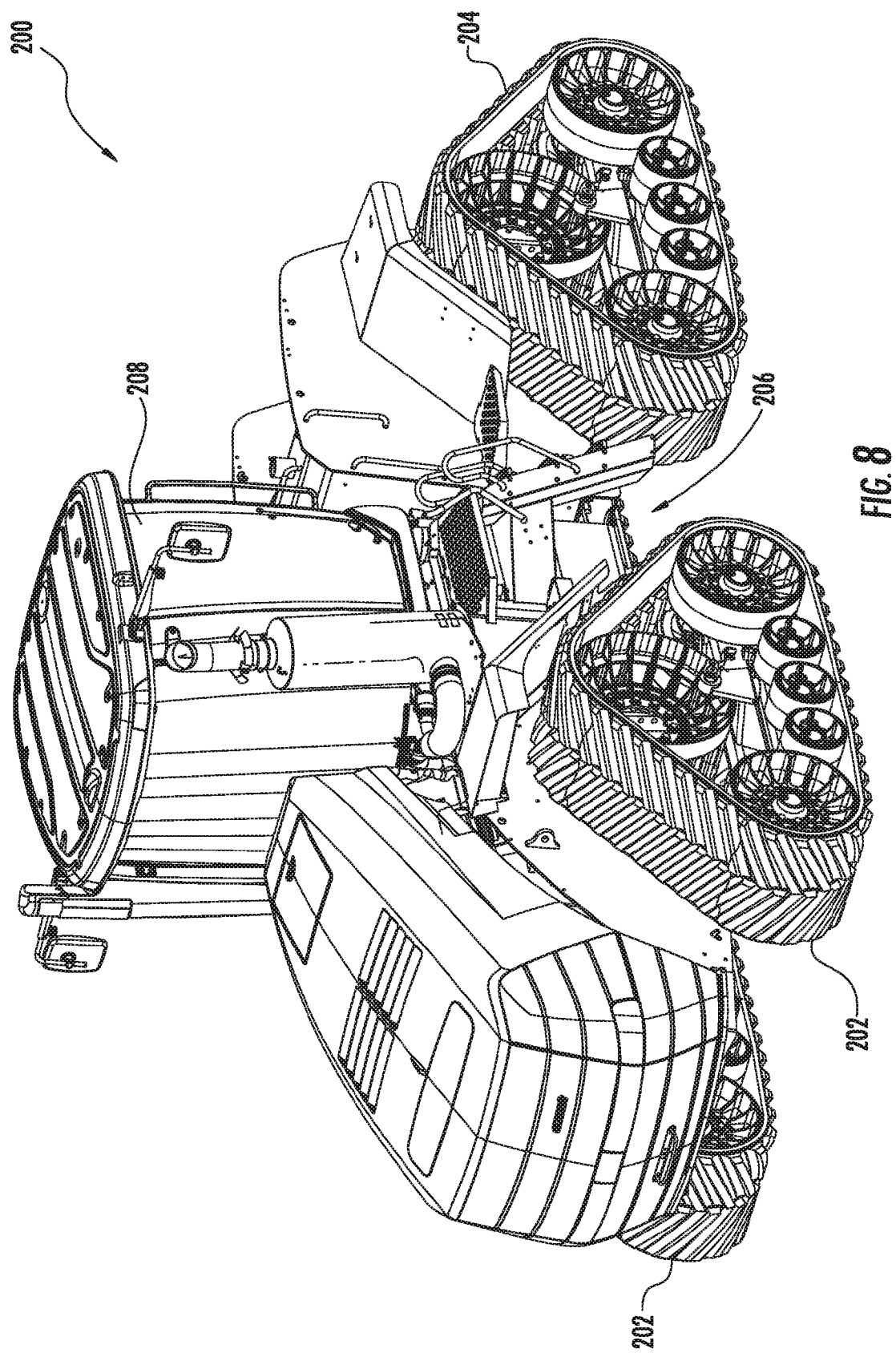
FIG. 8 illustrates a perspective view of one embodiment of a work vehicle in accordance with aspects of the present subject matter.

As shown in FIG. 8, the work vehicle 200 may include a pair of front track assemblies 202, a pair or rear track assemblies 204 (only one of which is shown), and a chassis 206 coupled to and supported by the track assemblies 12, 14. The work vehicle 200 may also include a drivetrain (not shown) (e.g., an engine, a transmission and a drive axle assembly) supported by the chassis 206 and in mechanical communication with one or more of the front track assemblies 202 and/or the rear track assemblies 204. Additionally, an enclosed operator's cab 208 may be supported by a portion of the chassis 206 and may house various control devices (not shown) for permitting an operator to control the operation of the work vehicle 200.

It should be appreciated that the configuration of the work vehicle 200 described above and shown in FIG. 8 is provided only to place the present subject matter in an exemplary field of use. Thus, it should be apparent that the present subject matter may be readily adaptable to any manner of work vehicle configuration. For example, in an alternative embodiment, the work vehicle 200 may include an open operator's cab 208 and/or may be configured to be operably coupled to any suitable type of work implement, such as a trailer, spray boom, manure tank, feed grinder, plow and/or the like. Similarly, in another alternative embodiment, as opposed to having four track assemblies 202, 204, the work vehicle 200 may only include two track assemblies. For instance, the work vehicle 200 may include a first track assembly positioned along one side of the vehicle 10 and a second track assembly positioned along the other side of the vehicle 10.

Figure 9:
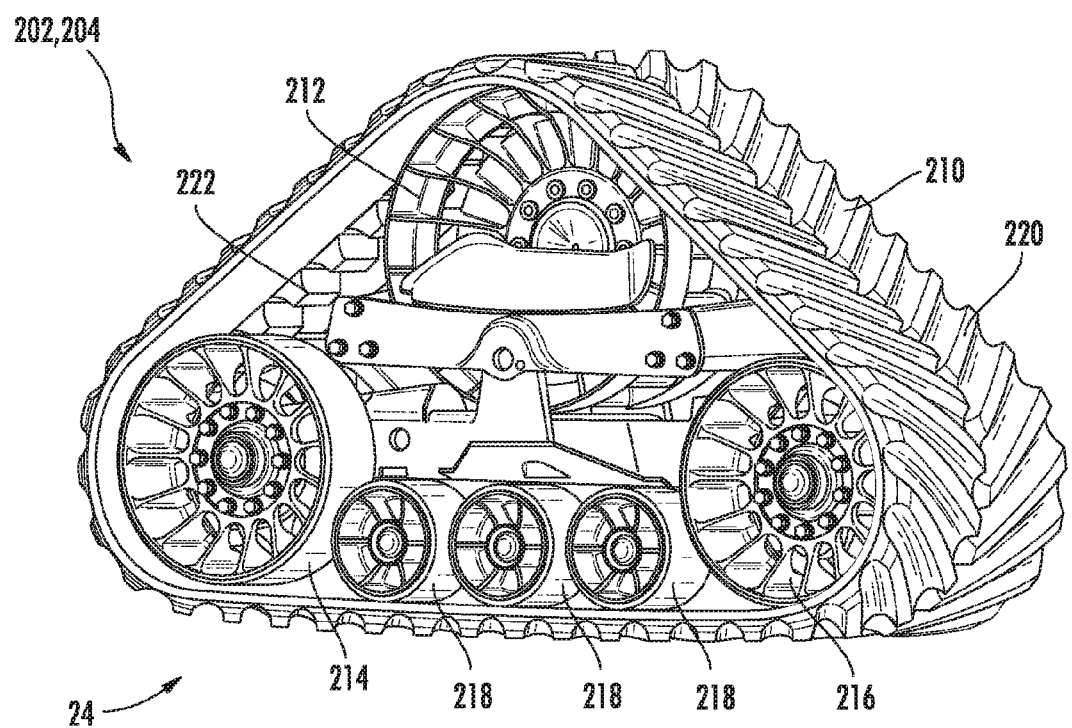
FIG. 9 illustrates a perspective view of one embodiment of a track assembly suitable for use with the work vehicle shown in FIG. 8, particularly illustrating various wheel assemblies of the track assembly within which the disclosed face seals may be installed.

Additionally, as shown in FIG. 9, each track assembly 202, 204 may generally include a track 210 and a drive wheel 212 for driving the track 210. As is generally understood, the drive wheel 212 may be in mechanical communication with the drivetrain of the work vehicle 20 for transferring rotational energy from the drivetrain to the drive wheel 212. In addition, the track assembly 202, 204 may include one or more secondary wheels, such as a front idler wheel 214, a rear idler wheel 216 and a plurality of roller wheels 218 positioned between the idler wheels 214, 216 so as to engage the portions of the track 210 contacting the ground. In such an embodiment, each of the various wheels 214, 216, 218 may be supported by or otherwise form part of a suitable wheel assembly, such as the wheel assembly 100 described above with reference to FIGS. 5-7C.

Moreover, as shown in FIG. 9, the track 210 corresponds to an endless or continuously looped track including a plural of treads 220 defining a tread pattern along on an outer surface of the track 210. In general, the track 210 may be comprised of any suitable material and may define any suitable tread pattern. For example, in several embodiments, the track 210 may be formed at least partially from an elastomeric material, such as a rubber material or a steel-reinforced rubber material. The treads 220 may be formed integrally with the track 210 or may be separately attached to the track 210, such as by chemically bonding the treads 220 to the track 210. Additionally, as shown in FIG. 9, the track 210 may include a plurality of longitudinally spaced drive lugs 222 extending radially inwardly from an inner surface of the track 210. As is generally understood, the drive lugs 222 may be configured to be mechanically engaged by the drive wheel 212 such that, as the drive wheel 212 is rotated, the track 210 rotates around the endless loop in order to drive the work vehicle 200.

It should be appreciated that the track assembly 202, 204 shown in FIG. 9 is simply illustrated to provide one example of a suitable track assembly configuration. In other embodiments, the track assembly 202, 204 may have any other suitable track-based configuration, including having any other suitable number of secondary wheels, such as any number of idler wheels 214, 216 and/or roller wheels 218, with such wheel(s) 214, 216, 218 being positioned at any suitable location(s) relative to the drive wheel 212. Additionally, the track assembly 202, 204 may generally define any other suitable shape. For instance, in the illustrated embodiment, the track assembly 202, 204 generally defines a triangular shape with rounded edges. In other embodiments, the track assembly 202, 204 may define more of an elliptical shape or a rectangular shape with rounded edges.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A face seal for use within a wheel assembly, comprising:
an inner sealing ring;
an outer sealing ring spaced radially outwardly from the inner sealing ring, the outer sealing ring comprising:
a first flange;
a second flange spaced apart axially from the first flange; and
an outer cylindrical portion extending between the first and second flanges, the outer cylindrical portion including a first cylindrical section extending axially from the first flange and a second cylindrical section extending axially between the first cylindrical section and the second flange; and
an inner elastomeric ring extending between the inner and outer sealing rings; and
an outer elastomeric ring having an axial portion extending radially outwardly from the second cylindrical section of the outer cylindrical portion, the axial portion defining an outer surface,
wherein the axial portion is radially offset from the first cylindrical section of the outer cylindrical portion such that an outer surface of the first cylindrical section is spaced radially outwardly relative to the outer surface of the axial portion.

2. The face seal of claim 1, wherein the second cylindrical section is radially offset from the first cylindrical section such that the outer surface of the first cylindrical section is spaced radially outwardly relative to an outer surface of the second cylindrical section.

3. The face seal of claim 1, wherein the first cylindrical section is connected to the second cylindrical section by a transition section, the transition section extending radially inwardly from the first cylindrical section to the second cylindrical section.

4. The face seal of claim 1, wherein the outer surface of the first cylindrical section defines a first outer diameter of the face seal and the outer surface of the axial portion defines a second outer diameter of the face seal, the first outer diameter being greater than the second outer diameter.

5. The face seal of claim 1, wherein the inner sealing ring comprises:
an axially extending inner cylindrical portion; and
a planar ring portion extending radially outwardly relative to the inner cylindrical portion,
wherein portions of the inner elastomeric ring contact the inner cylindrical portion and the planar ring portion of the inner sealing ring.

6. The face seal of claim 1, wherein an outer surface of the inner elastomeric ring is in contact with the first and second cylindrical sections of the outer sealing ring.

7. The face seal of claim 1, wherein the outer elastomeric ring further comprises a radial portion extending radially from the axial portion adjacent to the second flange of the outer sealing ring.

8. The face seal of claim 1, wherein the first flange extends radially outwardly from the first cylindrical section such that the first flange is oriented generally perpendicular to a central axis of the face seal.

9. The face seal of claim 1, wherein the second flange extends radially inwardly from the second cylindrical section such that the second flange is oriented generally perpendicular to a central axis of the face seal.

10. A wheel assembly for a work vehicle, the wheel assembly comprising:
a shaft;
a wheel hub rotatable relative the shaft, the hub defining a bore;
at least one bearing assembly positioned between the shaft and the wheel hub; and
a face seal at least partially installed within the bore, the face seal comprising:
an inner sealing ring;
an outer sealing ring spaced radially outwardly from the inner sealing ring, the outer sealing ring comprising:
a first flange;
a second flange spaced apart axially from the first flange; and
an outer cylindrical portion extending between the first and second flanges, the outer cylindrical portion including a first cylindrical section extending axially from the first flange and a second cylindrical section extending axially between the first cylindrical section and the second flange;
an inner elastomeric ring extending between the inner and outer sealing rings; and
an outer elastomeric ring having an axial portion extending circumferentially around the second cylindrical section of the outer cylindrical portion, the axial portion defining an outer surface,
wherein the axial portion is radially offset from the first cylindrical section of the outer cylindrical portion such that an outer surface of the first cylindrical section is spaced radially outwardly relative to the outer surface of the axial portion.

11. The wheel assembly of claim 10, wherein the outer surface of the first cylindrical section defines a first outer diameter of the face seal and the outer surface of the axial portion defines a second outer diameter of the face seal, the first outer diameter being greater than the second outer diameter.

12. The wheel assembly of claim 11, wherein the bore includes a first bore portion and a second bore portion radially offset from the first bore portion such that the first bore portion defines a first inner diameter of the bore and the second bore portion defines a second inner diameter of the bore, the first inner diameter being greater than the second inner diameter.

13. The wheel assembly of claim 12, wherein the second outer diameter is less than the first inner diameter.

14. The wheel assembly of claim 12, wherein the first outer diameter is greater than or equal to the first inner diameter and the second outer diameter is greater than or equal to the second inner diameter.

15. The wheel assembly of claim 10, wherein the first cylindrical section is connected to the second cylindrical section by a transition section, the transition section extending radially inwardly from the first cylindrical section to the second cylindrical section.

16. The wheel assembly of claim 10, wherein the outer elastomeric ring further comprises a radial portion extending radially from the axial portion adjacent to the second flange of the outer sealing ring.

17. The wheel assembly of claim 10, wherein the first flange extends radially outwardly from the first cylindrical section such that the first flange is oriented generally perpendicular to a central axis of the face seal.

18. The wheel assembly of claim 10, wherein the second flange extends radially inwardly from the second cylindrical section such that the second flange is oriented generally perpendicular to a central axis of the face seal.

19. The face seal of claim 1, wherein the axial portion is radially offset from the first cylindrical section of the outer cylindrical portion such that the outer surface of the first cylindrical section is spaced radially outwardly relative to the outer surface of the axial portion when the outer elastomeric ring is an uninstalled or non-compressed state relative to the wheel assembly.

20. The wheel assembly of claim 10, wherein the axial portion is radially offset from the first cylindrical section of the outer cylindrical portion such that the outer surface of the first cylindrical section is spaced radially outwardly relative to the outer surface of the axial portion when the face seal is an uninstalled or non-compressed state relative to the bore.

* * * * *